Sept. 24, 1940.  J. D. VECCHIA  2,215,772
FISH LURE
Filed March 11, 1940  2 Sheets-Sheet 1
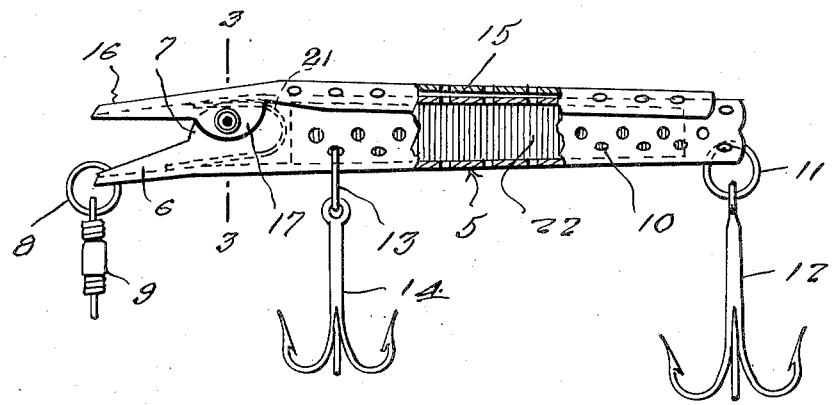
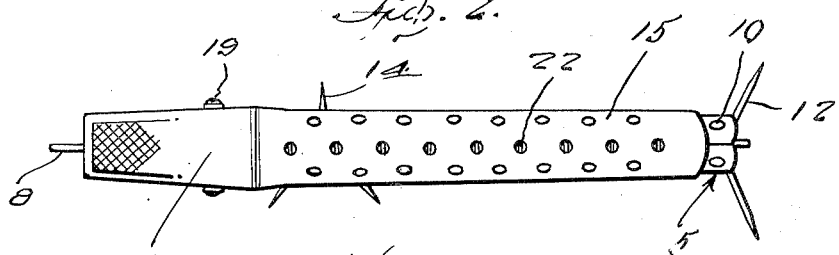
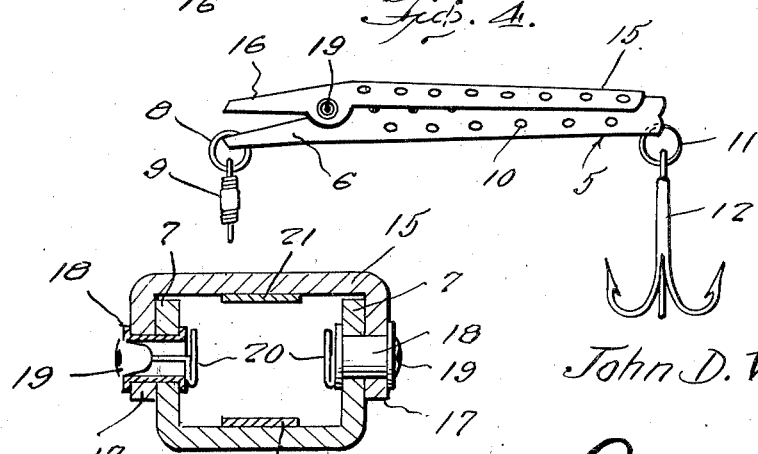
Inventor
John D. Vecchia
By Clarence A. O'Brien
Attorneys Sept. 24, 1940. J. D. VECCHIA 2,215,772
FISH LURE
Filed March 11, 1940 2 Sheets-Sheet 2
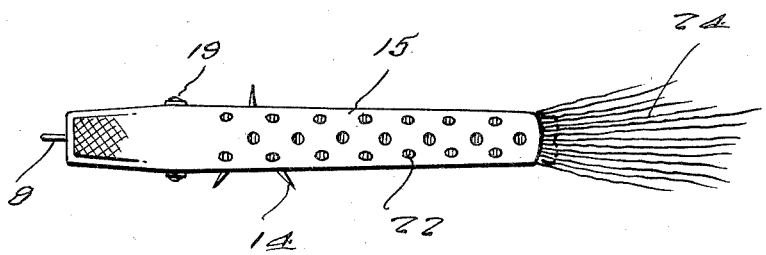
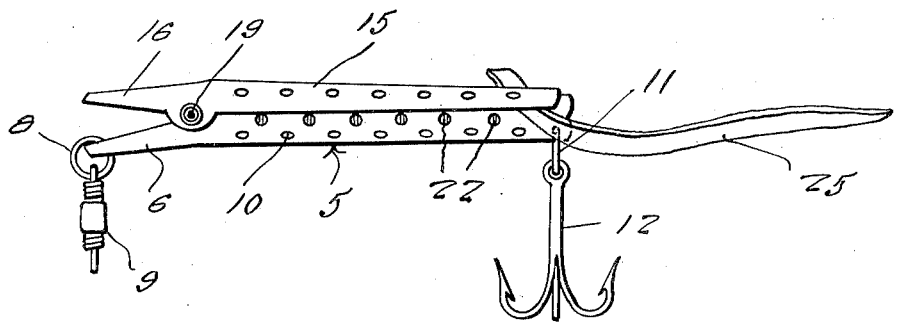
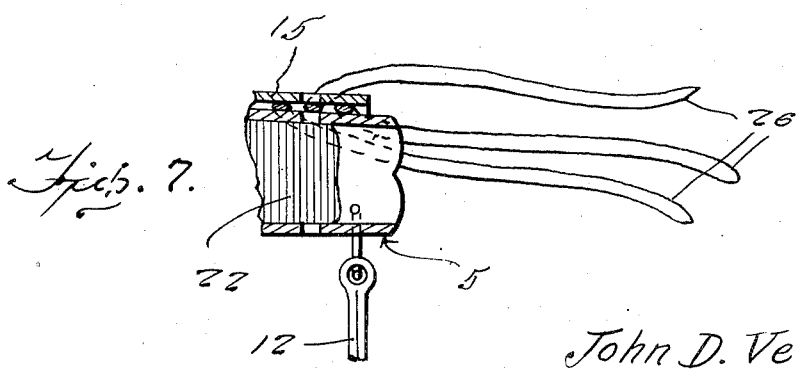
Inventor
John D. Vecchia
By Clarence A. O'Brien
Attorneys Patented Sept. 24, 1940

2,215,772

UNITED STATES PATENT OFFICE 2,215,772

FISH LURE

John D. Vecchia, Amsterdam, N. Y.

Application March 11, 1940, Serial No. 323,422

4 Claims. (Cl. 43—46)

This invention relates to an artificial fish lure, and has for the primary object the provision of an efficient, indestructible and inexpensive device of the above stated character which in appearance will simulate a fish of a size used for bait and may have its appearance as well as its color altered to suit different kinds of fishing or to suit the individual fisherman's desires and may be employed in conjunction with certain kinds of live bait or with artificial or natural bait foods.

With these and other objects in view, the invention consists in certain novel features of construction, combination and arrangement of parts to be hereinafter more fully described and claimed.

For a complete understanding of my invention, reference is to be had to the following description and accompanying drawings, in which:

Figure 1 is a side elevation, partly in section, illustrating an artificial fish lure constructed in accordance with my invention.

Figure 2 is a top plan view illustrating the same.

Figure 3 is a transverse sectional view taken on the line 3—3 of Figure 1.

Figure 4 is a side elevation illustrating the lures constructed on a smaller scale and equipped with a single hook unit.

Figure 5 is a top plan view illustrating the application of feathers or hairs to the lure.

Figure 6 is a side elevation illustrating the device with bait such as pork rind or the like connected therewith.

Figure 7 is a fragmentary vertical sectional view illustrating a portion of the lure with live bait connected thereto such as worms.

Referring in detail to the drawings, the numeral 5 indicates an elongated metallic body of hollow formation and substantially tubular throughout its major portion. One end portion of the body 5 is cut away to form a jaw portion 6 and a pair of spaced ears 7. The free end of the jaw portion is apertured to receive a ring 8 to which a swivel 9 is connected. The body 5 throughout its major portion is provided with a series of ports or perforations 10 and one of these ports or perforations at the end of the tubular portion of the body receives a ring 11 on which is mounted a fish hook 12. While the type of hook shown in Figure 1 includes a series of prongs, it is to be understood that other types of hooks may be applied to the ring 11. Certain of the ports or openings of the body adjacent its other end receives a ring 13 carrying a fish hook 14.

Coactive with the body is a clamping element 15 also perforated and the major portion thereof is transversely curved to conform to the contour of the body while one end portion is cut-away to form a jaw portion 16 coactive with the jaw portion 6 in defining the mouth of the fish. The clamp element adjacent the jaw portion 16 is provided with ears 17 that overlap the ears 7. Hollow rivets 18 extend through the apertures of the ears 7 and 17 to act as pivots for the clamping element 15 and mounted in the outer ends of the rivets are artificial eyes 19 held in place by spring members 20 that extend through the rivets and spread within the space between the ears 7. The ears and eyes as well as the jaw portions coact in forming the head of the lure at one end of the body 5.

A spring member 21 is confined in the head of the lure and bears against the jaw portions 16 and 17 urging the latter apart and consequently urging the clamping element 15 into tight engagement with the body 5. The clamping element has openings or ports aligning with certain of the openings or ports 10 of the body so as to expose to view a colored filler 22 packed in the body. This filler may be of any desired material and of any desired color, the purpose of which is to provide to the body a speckled appearance which with the color of the body simulates speckled fish of a bait size.

Strands of hair 24 may be arranged in a group and clamped on the body by the clamping element 15 so as to trail at the rear end of said body to provide thereto a tail, or if desired, feathers may be clamped on the body by the clamping element or any other type of fish lure decorative material.

As shown in Figure 6 pork rinds 25 may be clamped on the body by the clamping element to trail behind said body, or if desired, a fish tail severed from a fish may be clamped on the rear end of the body by the clamping element or, as shown in Figure 7, live bait such as worms, indicated by the character 26, may be clamped on the rear end of the body by the clamping element and permitted to trail behind the device as the latter is drawn through the water.

It is to be understood that the body and clamping element are preferably constructed of rustproof metallic material having a shiny appearance which with the filler will render the device extremely attractive for luring fish and will be practically indestructible. Also, it will be understood that the color of the filler can be easily changed by substitution of one filler by another within the body. While this lure may be distinctly an artificial proposition it also may be used in conjunction with live bait and other forms of fish bait as explained heretofore.

It is believed that the foregoing description, when taken in connection with the drawings, will fully set forth the construction and advantages of this invention to those skilled in the art to which such a device relates, so that further detailed description will not be required.

Having thus described my invention, what I claim is:

1. A fish lure comprising an elongated perforated rigid body having a chamber to receive a colored material observable through the perforations to give the body a colored speckled appearance, said body having a portion thereof cut-away to form a jaw portion, a clamping element engaging said body to grip and secure materials on the body and having a portion cut-away to form a jaw portion coactive with the first jaw portion in forming a mouth for said body.

2. A fish lure comprising an elongated perforated rigid body having a chamber to receive a colored material observable through the perforations to give the body a colored speckled appearance, said body having a portion thereof cut-away to form a jaw portion, a clamping element engaging said body to grip and secure materials on the body and having a portion cut-away to form a jaw portion coactive with the first jaw portion in forming a mouth for said body, said jaw portions having apertured overlapping parts with the apertures in alignment, pivots extending through the apertures.

3. A fish lure comprising an elongated perforated rigid body having a chamber to receive a colored material observable through the perforations to give the body a colored speckled appearance, said body having a portion thereof cut-away to form a jaw portion, a clamping element engaging said body to grip and secure materials on the body and having a portion cut-away to form a jaw portion coactive with the first jaw portion in forming a mouth for said body, said jaw portions having apertured overlapping parts with the apertures in alignment, hollow rivets extending through the apertures to form pivots for the jaw portions, and artificial eyes mounted in the rivets.

4. A fish lure comprising an elongated perforated rigid body having a chamber to receive a colored material observable through the perforations to give the body a colored speckled appearance, said body having a portion thereof cut-away to form a jaw portion, a clamping element engaging said body to grip and secure materials on the body and having a portion cutaway to form a jaw portion coactive with the first jaw portion in forming a mouth for said body, said jaw portions having apertured overlapping parts with the apertures in alignment, hollow rivets extending through the apertures to form pivots for the jaw portions, artificial eyes mounted in the rivets, a bowed spring engageable with the jaw portions acting to urge the latter apart and the clamping element in engagement with the body.

JOHN D. VECCHIA.